(12) United States Patent
Lee et al.

(10) Patent No.: US 9,816,568 B2
(45) Date of Patent: Nov. 14, 2017

(54) LATCHING SPRING DISCONNECT CLUTCH

(71) Applicant: Schaeffler Technologies AG & Co. KG, Herzogenaurach (DE)

(72) Inventors: Brian Lee, York, SC (US); Justin Bitar, Charlotte, NC (US); Bobby Hinson, Charlotte, NC (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 266 days.

(21) Appl. No.: 14/838,413

(22) Filed: Aug. 28, 2015

(65) Prior Publication Data

US 2016/0091034 A1 Mar. 31, 2016

Related U.S. Application Data (60) Provisional application No. 62/056,774, filed on Sep. 29, 2014.

(51) Int. Cl.
| | |
|---|---|
| *F16D 23/12* | (2006.01) |
| *F16D 27/102* | (2006.01) |
| *F16D 27/11* | (2006.01) |
| F16D 27/00 | (2006.01) |
| F16D 15/00 | (2006.01) |

(52) U.S. Cl.
CPC .......... *F16D 23/12* (2013.01); *F16D 27/102* (2013.01); *F16D 27/11* (2013.01); *F16D 15/00* (2013.01); *F16D 2027/007* (2013.01)

(58) Field of Classification Search
None
See application file for complete search history.

(56) References Cited

U.S. PATENT DOCUMENTS

| | | | |
|---|---|---|---|
| 6,095,276 A | 8/2000 | Kuroda et al. | |
| 6,622,838 B2 | 9/2003 | Suzuki | |
| 6,827,663 B2 | 12/2004 | Tucker-Peake | |
| 7,210,565 B2 | 5/2007 | Yamazaki et al. | |
| 8,808,127 B2 | 8/2014 | Seidl et al. | |
| 2008/0053780 A1 | 3/2008 | Hamrin et al. | |
| 2014/0231208 A1 | 8/2014 | Lee et al. | |
| 2015/0300421 A1* | 10/2015 | Lee ........................ | B60K 17/35 475/220 |
| 2016/0238089 A1* | 8/2016 | Lee ......................... | F16D 43/00 |
| 2016/0341262 A1* | 11/2016 | Ramsey ................ | F16D 41/063 |

FOREIGN PATENT DOCUMENTS

GB 2235425 A 3/1991

* cited by examiner

*Primary Examiner* — Jacob S Scott
(74) *Attorney, Agent, or Firm* — Kevin L. Parks (57) ABSTRACT

A disconnect clutch includes a wedge carrier, a wedge plate, an inner hub and a latching diaphragm spring. The wedge carrier has a pair of inwardly facing tapered rings. The wedge plate has a pair of outwardly facing tapered ring portions for mating engagement with the wedge carrier inwardly facing tapered rings, a plurality of inner ramp portions with respective tapered inner surfaces, and a radially flexible middle portion connecting the outwardly tapered ring portions and plurality of inner ramp portions. The inner hub has a plurality of outer ramp portions with tapered outer surfaces for engagement with the plurality of wedge plate ramp portion tapered inner surfaces. The latching diaphragm spring is for displacing the inner hub relative to the wedge carrier to radially expand the wedge plate.

18 Claims, 7 Drawing Sheets

LATCHING SPRING DISCONNECT CLUTCH

FIELD

The invention relates generally to a disconnect clutch, and more specifically to a disconnect clutch with a latching spring.

BACKGROUND

Disconnect clutches are known. One example is shown in commonly assigned United States Patent Publication No. 2014/0231208.

BRIEF SUMMARY

Example aspects broadly comprise a disconnect clutch including a wedge carrier, a wedge plate, an inner hub and a latching diaphragm spring. The wedge carrier has a pair of inwardly facing tapered rings. The wedge plate has a pair of outwardly facing tapered ring portions for mating engagement with the wedge carrier inwardly facing tapered rings, a plurality of inner ramp portions with respective tapered inner surfaces, and a radially flexible middle portion connecting the outwardly tapered ring portions and plurality of inner ramp portions. The inner hub has a plurality of outer ramp portions with tapered outer surfaces for engagement with the plurality of wedge plate ramp portion tapered inner surfaces. The latching diaphragm spring is for displacing the inner hub relative to the wedge carrier to radially expand the wedge plate.

In an example embodiment, radially expanding the wedge plate includes engaging the wedge plate outwardly facing tapered ring portions with the wedge carrier inwardly facing tapered rings. In an example embodiment, the latching diaphragm spring is configurable to be convex or concave. In an example embodiment, the wedge carrier and the inner hub include respective inner spline portions for engaging respective transmission shafts. In an example embodiment, the wedge carrier includes a protrusion radially aligned with the wedge plate middle portion to limit axial displacement of the wedge plate. An outer portion of the latching diaphragm spring is engaged with the wedge carrier.

In some example embodiments, the disconnect clutch has an electromagnet with a ferrous core, a ferrous armature, and an energizable coil. The ferrous core has a c-shaped ring portion. The ferrous armature is for displacing the latching diaphragm spring. The armature is axially displaceable within the c-shaped ring portion. The energizable coil is for axially displacing the armature. In some example embodiments, the ferrous armature is an annular ring. In some example embodiments, the disconnect clutch has a ring segment fixed to the ferrous armature and axially fixed to the inner hub. In an example embodiment, the disconnect clutch has a thrust bearing disposed axially between the ring segment and the latching diaphragm spring.

In an example embodiment, the disconnect clutch has a radial bearing disposed radially between the ferrous core and the inner hub. In an example embodiment, the clutch has a housing. The ferrous core is installed within the housing and the wedge carrier is rotatably supported in the housing. In an example embodiment, the latching diaphragm spring is configurable to be convex or concave and axially displacing the armature displaces the latching diaphragm spring into the convex or the concave configuration.

Other example aspects broadly comprise an electrically actuate disconnect clutch including a latching diaphragm spring and an electromagnet. The latching diaphragm spring is configurable to be concave or convex. The electromagnet has an armature for displacing the latching diaphragm spring between the concave and convex configurations. In some example embodiments, the latching diaphragm spring includes a spring force that varies with displacement and includes an inflection point, the electromagnet includes an actuating force that varies with displacement and includes an inflection point, and the electrically actuated disconnect clutch is configured such that the latching diaphragm spring force inflection point is aligned with the electromagnet force inflection point.

In an example embodiment, the electromagnet force is greater than and opposite to the latching diaphragm spring force for travel between the diaphragm spring concave and convex configurations. In an example embodiment, energizing the electromagnet displaces the latching diaphragm spring from one of the concave or convex configurations to its inflection point, and de-energizing the electromagnet as the latching diaphragm spring travel approaches the latching diaphragm spring inflection point allows the latching diaphragm spring to continue displacement to the other of the concave or convex configurations.

In some example embodiments, the electrically actuated disconnect clutch has a wedge carrier, an inner hub, and a wedge plate. The wedge carrier includes an inner spline. The inner hub includes an inner spline. The wedge plate is radially disposed between the wedge plate and the inner hub. The latching diaphragm spring operates on the inner hub to engage or disengage the wedge plate with the wedge carrier. In an example embodiment, engaging the wedge plate with the wedge carrier rotationally connects the wedge carrier inner spline and the inner hub inner spline.

BRIEF DESCRIPTION OF THE DRAWINGS

The nature and mode of operation of the present invention will now be more fully described in the following detailed description taken with the accompanying drawing figures, in which.

DETAILED DESCRIPTION

At the outset, it should be appreciated that like drawing numbers appearing in different drawing views identify identical, or functionally similar, structural elements. Further-more, it is understood that this invention is not limited only to the particular embodiments, methodology, materials and modifications described herein, and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the following example methods, devices, and materials are now described.

Figure 1:
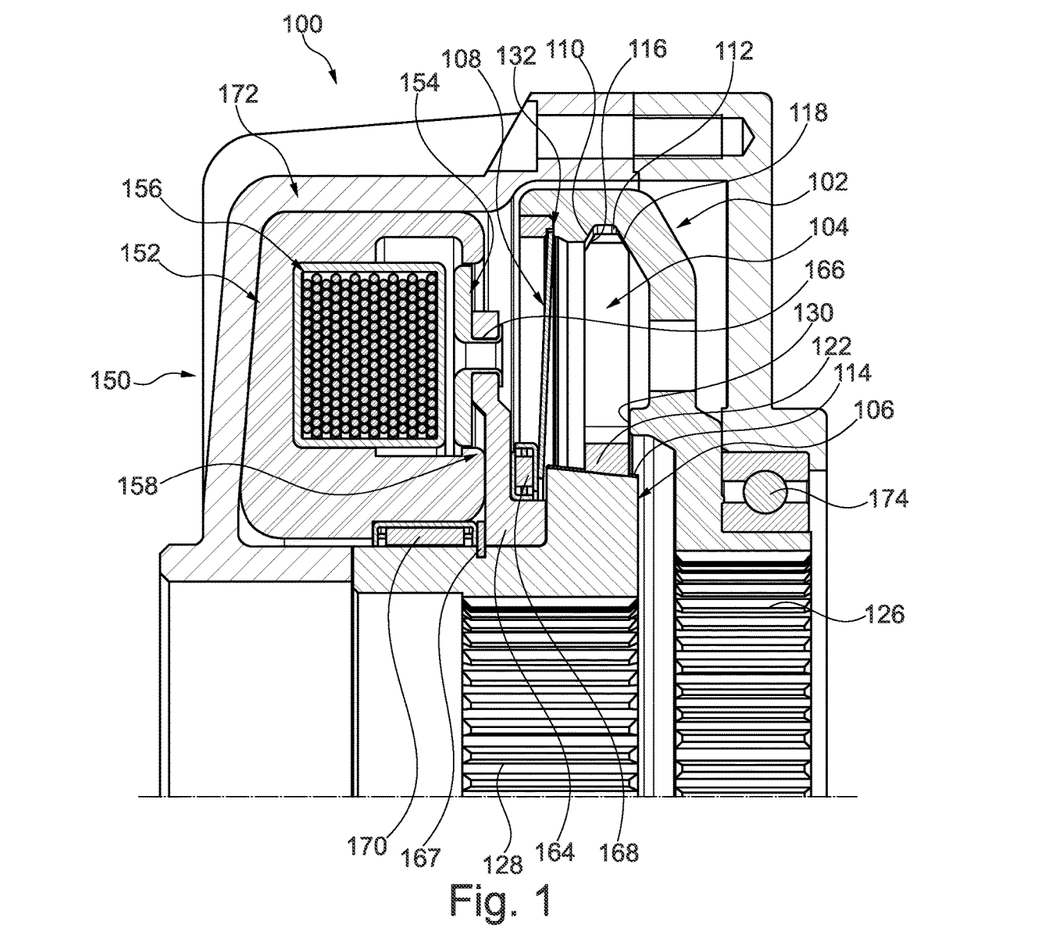
FIG. 1 is a cross section view of a disconnect clutch shown in a disengaged state according to an example aspect.
Figure 2:
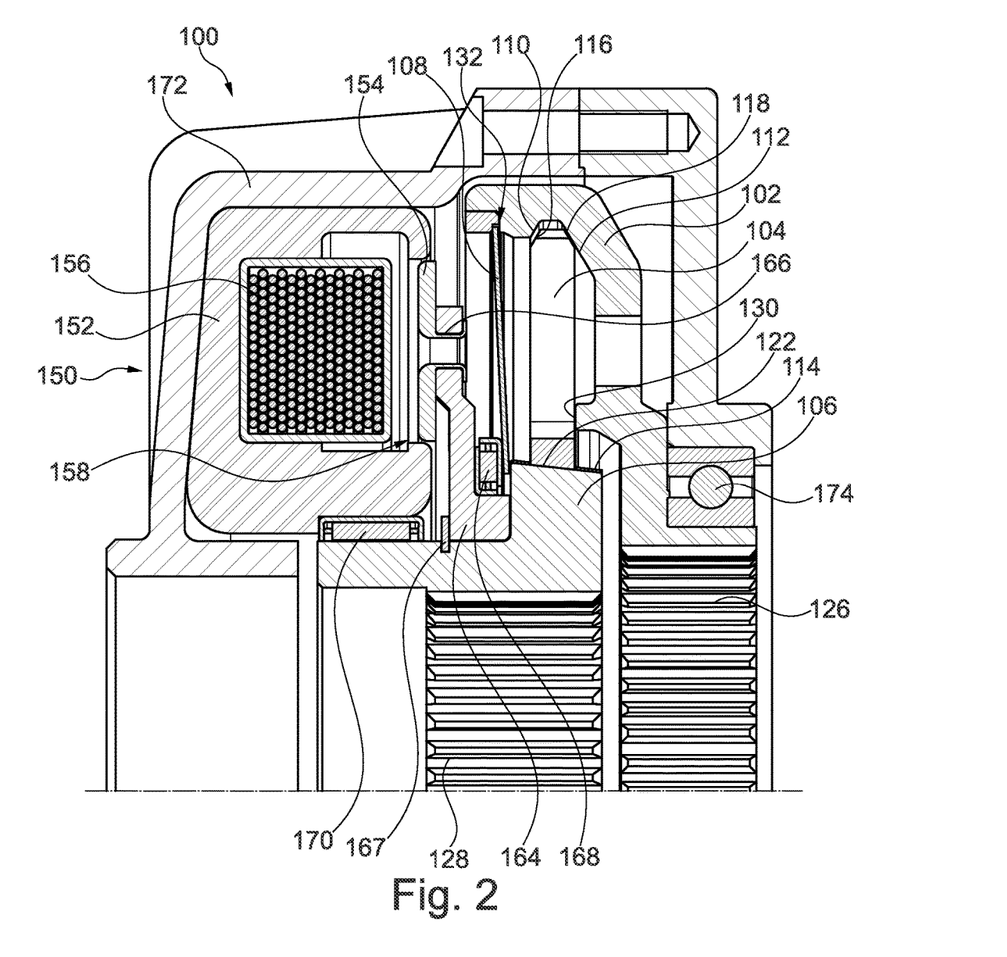
FIG. 2 is a cross section view of the disconnect clutch of FIG. 1 shown in an engaged state according to an example aspect.
Figure 3:
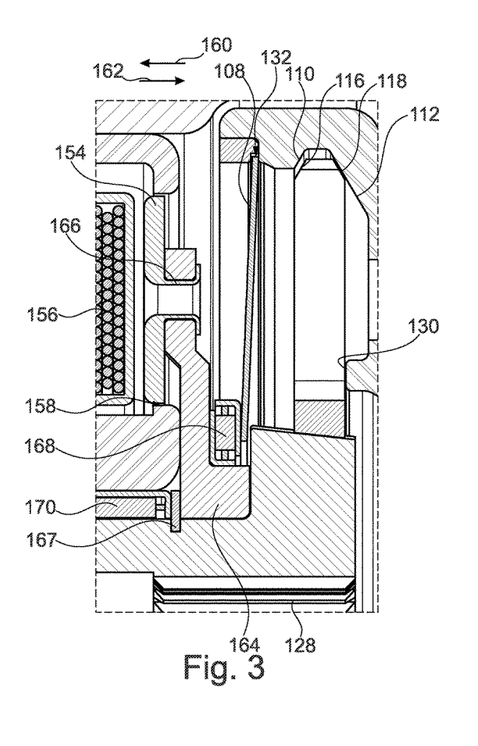
FIG. 3 is a detail view of the disconnect clutch of FIG. 1 shown in a disengaged state.
Figure 4:
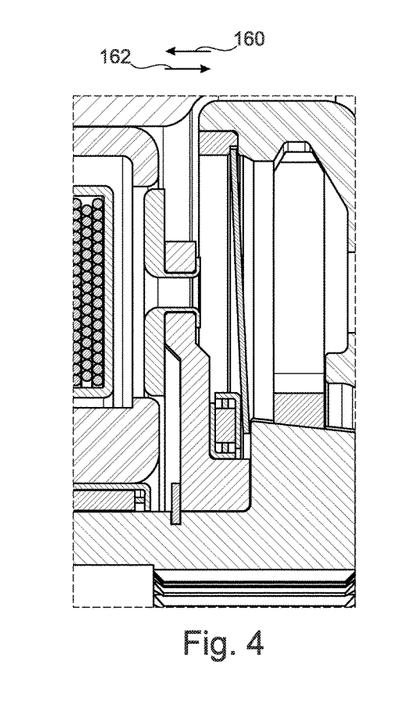
FIG. 4 is a detail view of the disconnect clutch of FIG. 2 shown in an engaged state.

The following description is made with reference to FIGS. 1-4. FIG. 1 is a cross section view of disconnect clutch 100 shown in a disengaged state according to an example aspect. FIG. 2 is a cross section view of disconnect clutch 100 shown in an engaged state according to an example aspect. FIG. 3 is a detail view of disconnect clutch 100 of FIG. 1 shown in a disengaged state. FIG. 4 is a detail view of disconnect clutch 100 of FIG. 2 shown in an engaged state. Disconnect clutch 100 includes wedge carrier 102, wedge plate 104, inner hub 106, and latching diaphragm spring 108. Wedge carrier 102 includes chamfered surfaces, or inwardly facing tapered rings, 110 and 112. Inner hub 106 includes outer ramp portions 114 with tapered outer surfaces similar to the inner hub shown and described in commonly-assigned U.S. Provisional Patent Application Ser. No. 61/980,974 titled DISCONNECT SYSTEM FOR AN ALL-WHEEL DRIVE VEHICLE DRIVE TRAIN to Lee et al., hereby incorporated by reference as if set forth fully herein.

Figure 5:
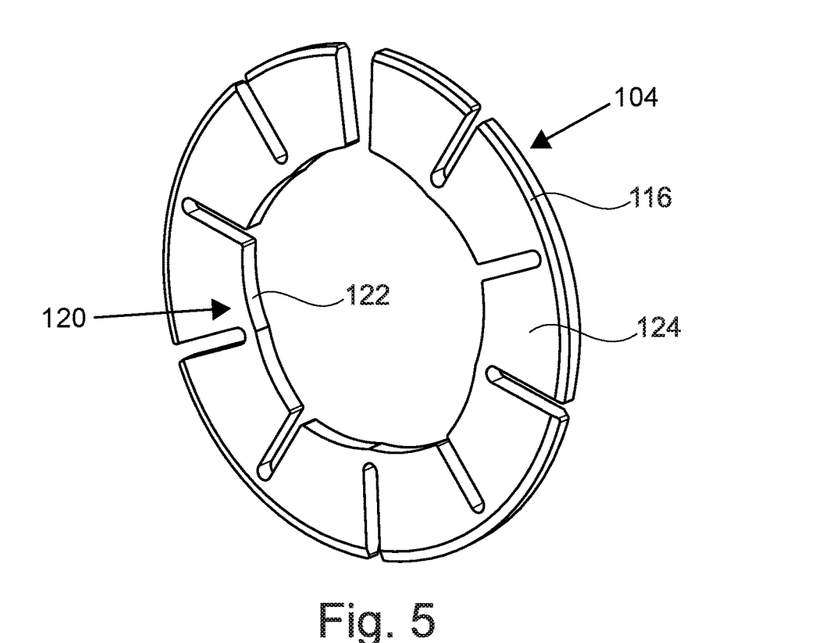
FIG. 5 is a perspective view of a wedge plate according to an example aspect.
Figure 6:
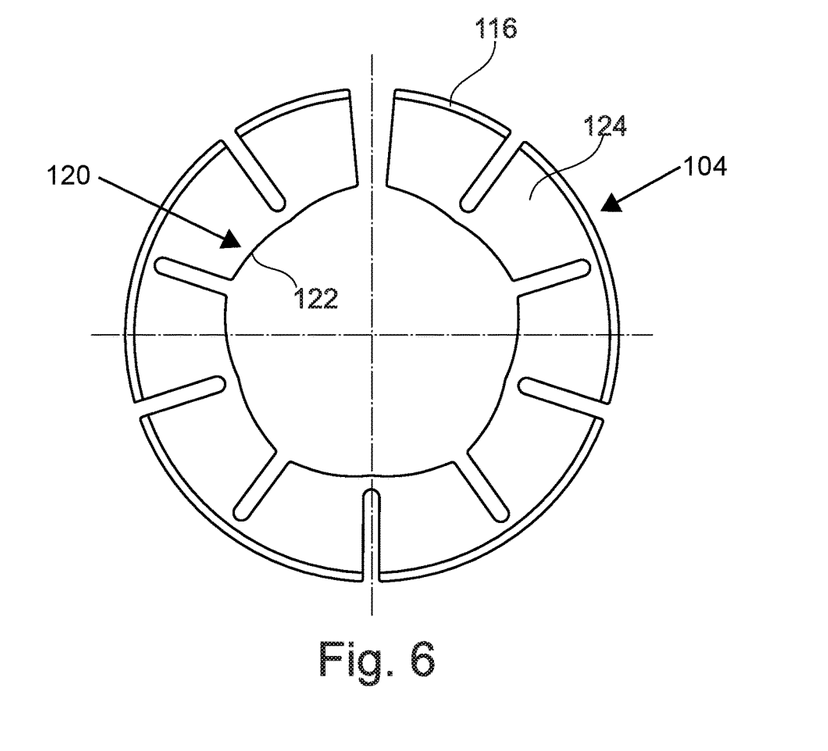
FIG. 6 is a front view of the wedge plate of FIG. 5.

The following description is made with reference to FIGS. 1-6. FIG. 5 is a perspective view of wedge plate 104. FIG. 6 is a front view of wedge plate 104. Wedge plate 104 includes outwardly facing tapered ring portions 116 and 118 for mating engagement with wedge carrier inwardly facing tapered rings 110 and 112, respectively. Wedge plate 104 further includes inner ramp portions 120 with respective tapered inner surfaces 122. Wedge plate 104 includes radially flexible middle portion 124 connecting the outwardly tapered ring portions and the inner ramp portions. The inner hub outer ramp portion tapered outer surfaces are for engagement with the wedge plate ramp portion tapered inner surfaces.

Latching diaphragm spring 108 displaces the inner hub relative to the wedge carrier to radially expand the wedge plate as described in further detail below. In an example embodiment, radially expanding wedge plate 104 includes engaging edge plate outwardly facing tapered ring portions 110 and 112 with wedge carrier inwardly facing tapered rings 116 and 118, respectively. The latching diaphragm spring is configurable to be convex as shown in FIG. 2 or concave as shown in FIG. 1. Wedge carrier 102 and inner hub 106 include respective inner spline portions 126 and 128 for engaging respective transmission shafts (not shown). Wedge carrier 102 includes protrusion 130 radially aligned with wedge plate middle portion 124 to limit axial displacement of the wedge plate. Outer portion 132 of the latching diaphragm spring is engaged with the wedge carrier.

Disconnect clutch 100 further includes electromagnet 150. Electromagnet 150 includes ferrous core 152, ferrous armature 154 and energizable coil 156. Ferrous core 152 includes c-shaped ring portion 158. Ferrous armature 154 is for displacing latching diaphragm spring 108. Armature 154 is axially displaceable within c-shaped ring portion 158. That is, the armature is moveable towards and away from energizable coil 156 while displacing axially relative to the ring portion. Energizable coil 156 is for axially displacing the armature. That is, when energized, the coil pulls the armature towards axial center of the ring portion as is known from electromagnets. In other words, when energized, the coil attempts to axially align the armature within the ring so if armature 154 is axially displaced relative to the ring in direction 160 (as shown in FIG. 3), the electromagnet moves the armature in direction 162, opposite direction 160, to align the armature in the ring. Similarly, if armature 154 is axially displaced relative to the ring in direction 162 (as shown in FIG. 4), the electromagnet moves the armature in direction 160.

In an example embodiment, ferrous armature 154 is an annular ring. Clutch 100 further includes ring segment 164 fixed to the ferrous armature by integral rivet 166, for example, and axially fixed to the inner hub by snap ring 167, for example. Clutch 100 includes thrust bearing 168 disposed axially between the ring segment and the latching diaphragm spring. Bearing 168 advantageously allows a relative speed difference between spring 108, fixed to and rotating with carrier 102, and non-rotating ring segment 164. Clutch 100 includes radial bearing 170 disposed radially between the ferrous core and the inner hub to permit relative rotation between the non-rotating core and the hub. Clutch 100 includes housing 172. Ferrous core 152 is installed within the housing and the wedge carrier is rotatably supported in the housing by bearing 174, for example. Axially displacing the armature displaces the latching diaphragm spring into the convex or the concave configuration.

Figure 7:
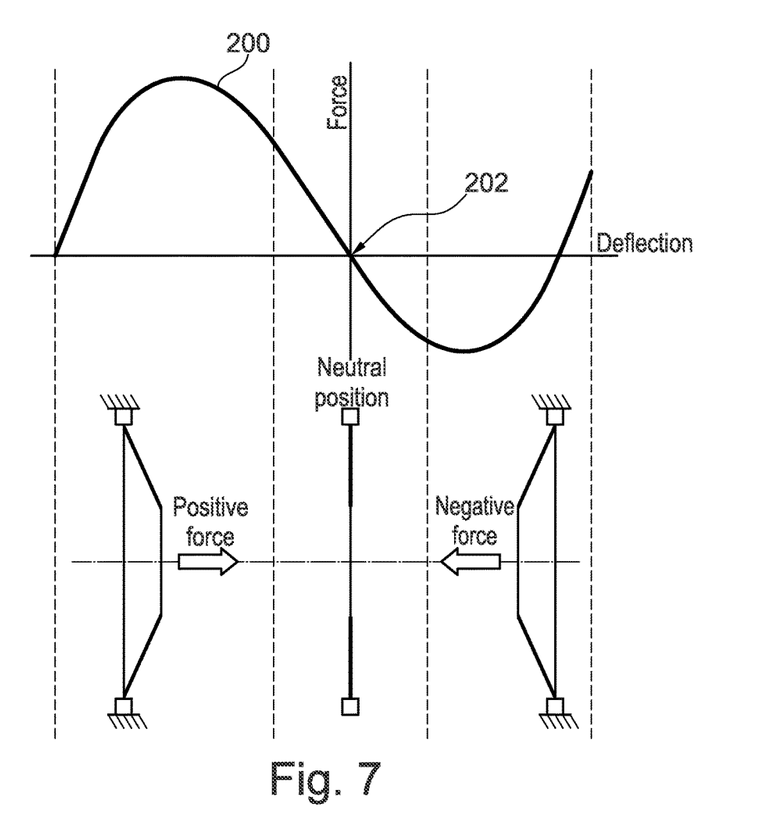
FIG. 7 is a force vs. deflection curve and a graphical representation of a latching diaphragm spring in various deflected states.
Figure 8:
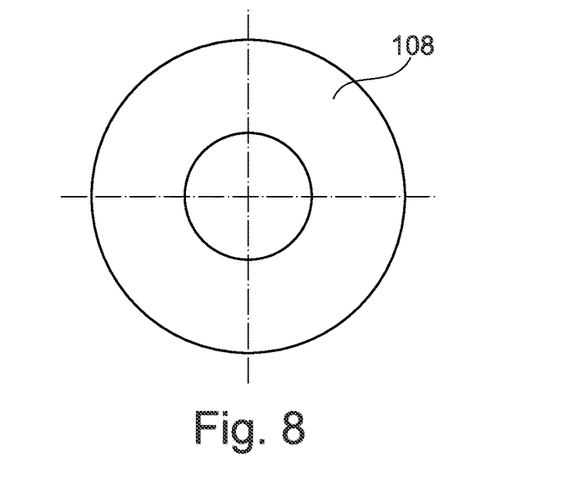
FIG. 8 is a front view of the spring of FIG. 7.
Figure 9:
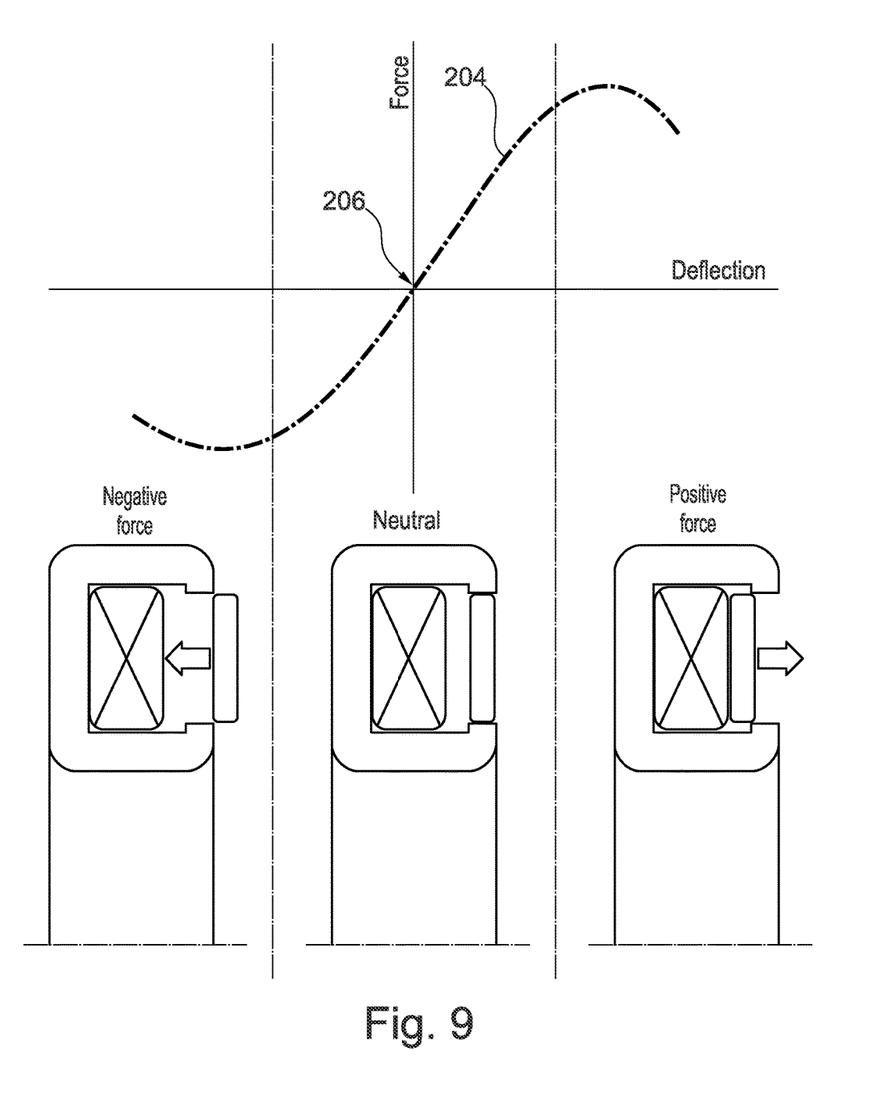
FIG. 9 is a force vs. deflection curve and graphical representation of an electromagnet in various operating states.
Figure 10:
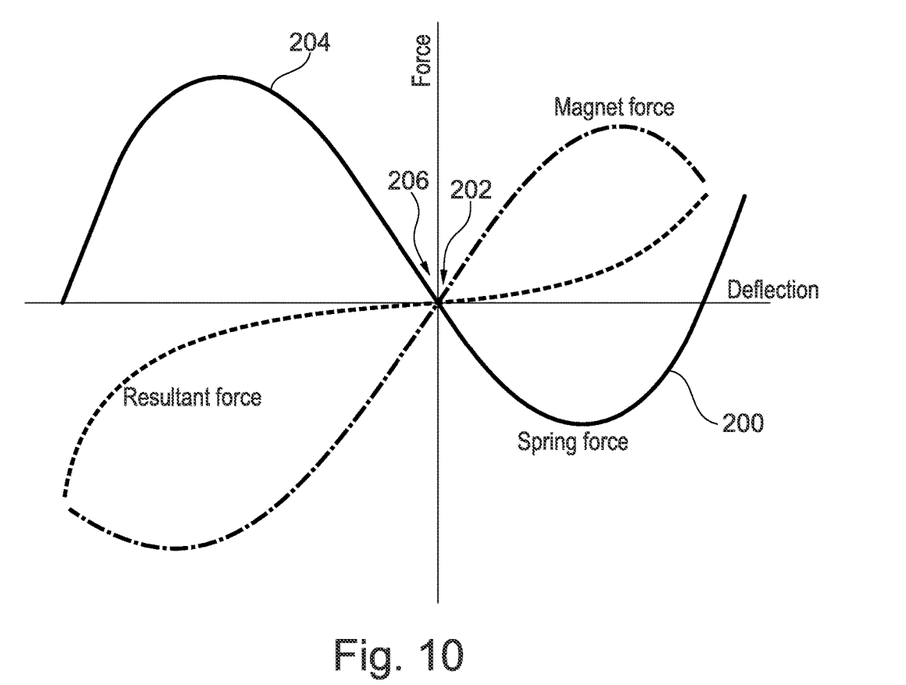
FIG. 10 is a combined force vs. deflection curve for the spring of FIG. 7 and the electromagnet of FIG. 9.

The following description is made with reference to FIGS. 7-10. FIG. 7 is a force vs. deflection curve and a graphical representation of diaphragm spring 108 in various deflected states. FIG. 8 is a front view of spring 108. FIG. 9 is a force vs. deflection curve and graphical representation of electromagnet 150 in various operating states. FIG. 10 is a combined force vs. deflection curve for spring 108 and electromagnet 150. As shown in FIG. 8, latching diaphragm spring 108 includes spring force 200 that varies with displacement and includes inflection point 202 where the spring force changes from positive to negative. That is, as the spring is flattened, its spring force initially resists deflection until a neutral position where the spring is approximately flat. At that point, the spring force pulls the spring in the deflected direction moving the spring from a concave shape to a convex shape or vice versa. Similarly, as shown in FIG. 9, displacement force 204 of the electromagnet is greatest when the armature is displaced away from the ring segment and approximately zero at inflection point 206 when the armature is aligned.

As can be seen in FIG. 10, the electrically actuated disconnect clutch is configured such that latching diaphragm spring force inflection point 202 is aligned with electromagnet force inflection point 206. It is also apparent from FIG. 10 that the electromagnet force is greater than and opposite to the latching diaphragm spring force for travel between the diaphragm spring concave and convex configurations. During operation, the electromagnet is energized and deenergized to displace the latching diaphragm spring. That is, energizing the electromagnet displaces the latching diaphragm spring from one of the concave or convex configurations to its inflection point and de-energizing the electromagnet as the latching diaphragm spring travel approaches the latching diaphragm spring inflection point allows the latching diaphragm spring to continue displacement to the other of the concave or convex configurations.

The following description is made with reference to FIGS. 1-10. As described above, latching disconnect clutch 100 includes wedge carrier 102 with inner spline 126 and inner hub 106 with inner spline 128. Wedge plate 104 is radially disposed between the wedge plate and the inner hub. Latching latching diaphragm spring operates on the inner hub to engage or disengage the wedge plate with the wedge carrier. Engaging the wedge plate with the wedge carrier rotationally connects the wedge carrier inner spline and the inner hub inner spline.

Of course, changes and modifications to the above examples of the invention should be readily apparent to those having ordinary skill in the art, without departing from the spirit or scope of the invention as claimed. Although the invention is described by reference to specific preferred and/or example embodiments, it is clear that variations can be made without departing from the scope or spirit of the invention as claimed.

What we claim is:

1. A disconnect clutch comprising:
   a wedge carrier including a pair of inwardly facing tapered rings;
   a wedge plate including:
      a pair of outwardly facing tapered ring portions for mating engagement with the wedge carrier inwardly facing tapered rings;
      a plurality of inner ramp portions with respective tapered inner surfaces; and,
      a radially flexible middle portion connecting the outwardly tapered ring portions and plurality of inner ramp portions;
   an inner hub including a plurality of outer ramp portions with tapered outer surfaces for engagement with the plurality of wedge plate ramp portion tapered inner surfaces; and,
   a latching diaphragm spring for displacing the inner hub relative to the wedge carrier to radially expand the wedge plate.

2. The disconnect clutch of claim 1 wherein radially expanding the wedge plate includes engaging the wedge plate outwardly facing tapered ring portions with the wedge carrier inwardly facing tapered rings.

3. The disconnect clutch of claim 1 wherein the latching diaphragm spring is configurable to be convex or concave.

4. The disconnect clutch of claim 1 wherein the wedge carrier and the inner hub include respective inner spline portions for engaging respective transmission shafts.

5. The disconnect clutch of claim 1 wherein:
   the wedge carrier includes a protrusion radially aligned with the wedge plate middle portion to limit axial displacement of the wedge plate; and
   an outer portion of the latching diaphragm spring is engaged with the wedge carrier.

6. The disconnect clutch of claim 1 further comprising an electromagnet including:
   a ferrous core including a c-shaped ring portion;
   a ferrous armature for displacing the latching diaphragm spring, the armature being axially displaceable within the c-shaped ring portion;
   a energizable coil for axially displacing the armature.

7. The disconnect clutch of claim 6 wherein the ferrous armature is an annular ring.

8. The disconnect clutch of claim 7 further comprising a ring segment fixed to the ferrous armature and axially fixed to the inner hub.

9. The disconnect clutch of claim 8 further comprising a thrust bearing disposed axially between the ring segment and the latching diaphragm spring.

10. The disconnect clutch of claim 6 further comprising a radial bearing disposed radially between the ferrous core and the inner hub.

11. The disconnect clutch of claim 6 further comprising a housing wherein the ferrous core is installed within the housing and the wedge carrier is rotatably supported in the housing.

12. The disconnect clutch of claim 6 wherein:
   the latching diaphragm spring is configurable to be convex or concave; and,
   axially displacing the armature displaces the latching diaphragm spring into the convex or the concave configuration.

13. An electrically actuated disconnect clutch comprising:
   a latching diaphragm spring configurable to be concave or convex; and,
   an electromagnet including an armature for displacing the latching diaphragm spring between the concave and convex configurations.

14. The electrically actuated disconnect clutch of claim 13 wherein:
   the latching diaphragm spring includes a spring force that varies with displacement and includes an inflection point;
   the electromagnet includes an actuating force that varies with displacement and includes an inflection point; and,
   wherein the electrically actuated disconnect clutch is configured such that the latching diaphragm spring force inflection point is aligned with the electromagnet force inflection point.

15. The electrically actuated disconnect clutch of claim 14 wherein the electromagnet force is greater than and opposite to the latching diaphragm spring force for travel between the diaphragm spring concave and convex configurations.

16. The electrically actuated disconnect clutch of claim 14 wherein:
   energizing the electromagnet displaces the latching diaphragm spring from one of the concave or convex configurations to its inflection point; and,
   de-energizing the electromagnet as the latching diaphragm spring travel approaches the latching diaphragm spring inflection point allows the latching diaphragm spring to continue displacement to the other of the concave or convex configurations.

17. The electrically actuated disconnect clutch of claim 13 further comprising:
   a wedge carrier including an inner spline;
   an inner hub including an inner spline; and,
   a wedge plate radially disposed between the wedge plate and the inner hub, wherein the latching diaphragm spring operates on the inner hub to engage or disengage the wedge plate with the wedge carrier.

18. The electrically actuated disconnect clutch of claim 17 wherein engaging the wedge plate with the wedge carrier rotationally connects the wedge carrier inner spline and the inner hub inner spline.

* * * * *